US012559063B2

(12) United States Patent
Goto et al.

(10) Patent No.: US 12,559,063 B2
(45) Date of Patent: \*Feb. 24, 2026

(54) AUTHENTICATION DEVICE, METHOD, NON-TRANSITORY STORAGE MEDIUM, AND VEHICLE

(71) Applicants: TOYOTA JIDOSHA KABUSHIKI KAISHA, Toyota (JP); Kabushiki Kaisha Tokai Rika Denki Seisakusho, Niwa-gun (JP)

(72) Inventors: Yuya Goto, Toyota (JP); Naoyuki Takada, Toyota (JP); Kosuke Taki, Niwa-gun (JP); Daisuke Ogawa, Niwa-gun (JP); Hirokazu Itakura, Niwa-gun (JP); Takahiko Ando, Niwa-gun (JP)

(73) Assignees: TOYOTA JIDOSHA KABUSHIKI KAISHA, Toyota (JP); Kabushiki Kaisha Tokai Rika Denki Seisakusho, Niwa-gun (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/785,815

(22) Filed: Jul. 26, 2024

(65) Prior Publication Data

US 2024/0383442 A1 Nov. 21, 2024

Related U.S. Application Data

(63) Continuation of application No. 17/643,946, filed on Dec. 13, 2021, now Pat. No. 12,077,129.

(30) Foreign Application Priority Data

Feb. 25, 2021 (JP) ................................. 2021-029057

(51) Int. Cl.
B60R 25/25 (2013.01)
B60R 25/102 (2013.01)
G06F 21/32 (2013.01)

(52) U.S. Cl.
CPC ............ B60R 25/25 (2013.01); B60R 25/102 (2013.01); G06F 21/32 (2013.01); B60R 25/252 (2013.01);
(Continued)

(58) Field of Classification Search
CPC ..... B60R 25/25; B60R 25/102; B60R 25/252; B60R 25/257; B60R 2325/205; B60R 25/24; G06F 21/32
See application file for complete search history.

(56) References Cited

U.S. PATENT DOCUMENTS

2014/0002237 A1* 1/2014 Infante .................... B60R 25/10
340/5.32
2015/0363986 A1* 12/2015 Hoyos ................... H04W 12/08
340/5.61

(Continued)

FOREIGN PATENT DOCUMENTS

EP 3 835 981 A1 6/2021
JP 2003-34235 A 2/2003
(Continued)

OTHER PUBLICATIONS

Genesis GV70—Luxury Midsize SUV | Genesis, Feb. 24, 2021, 1 page https://www.genesis.com/worldwide/en/models/luxurysuv-genesis/gv70/technology.html.
(Continued)

*Primary Examiner* — Omeed Alizada
(74) *Attorney, Agent, or Firm* — Oblon, McClelland, Maier & Neustadt, L.L.P.

(57) ABSTRACT

An authentication device to be mounted on a vehicle includes a processor. The processor is configured to execute
(Continued)

first authentication based on biometric information acquired from a user and biometric information preregistered in the vehicle. The processor is configured to execute second authentication different from the first authentication. The processor is configured to transit setting of the first authentication to a state in which the user is able to change the setting, when the second authentication is successful.

20 Claims, 7 Drawing Sheets

(52) U.S. Cl.
 CPC ....... *B60R 25/257* (2013.01); *B60R 2325/205* (2013.01)

(56) References Cited

U.S. PATENT DOCUMENTS

| | | | |
|---|---|---|---|
| 2018/0105137 A1 | 4/2018 | Kawamura et al. | |
| 2022/0135003 A1* | 5/2022 | Lee ................. | G06Q 20/40145 |
| | | | 701/2 |

| | | | |
|---|---|---|---|
| 2024/0383442 A1* | 11/2024 | Goto ...................... | G06F 21/32 |

FOREIGN PATENT DOCUMENTS

| | | |
|---|---|---|
| JP | 2011-58334 A | 3/2011 |
| JP | 2018-62306 A | 4/2018 |
| JP | 2020-024536 A | 2/2020 |

OTHER PUBLICATIONS

What Makes GV70's Fingerprint Recognition Technology Special (hyundaimotorgroup.com), Nov. 26, 2020, 1 page https://www. hyundaimotorgroup.com/story/CONT0000000000003682.
U.S. Office Action mailed Dec. 5. 2023, in co-pending U.S. Appl. No. 17/643.946.
U.S. Notice of Allowance mailed May 1, 2024, in co-pending U.S. Appl. No. 17/643,946.
U.S. Notice of Allowance mailed May 15, 2024, in co-pending U.S. Appl. No. 17/643,946.

* cited by examiner

AUTHENTICATION DEVICE, METHOD, NON-TRANSITORY STORAGE MEDIUM, AND VEHICLE

CROSS-REFERENCE TO RELATED APPLICATION

This application is a Continuation of application Ser. No. 17,643,946, filed Dec. 13, 2021, which claims priority to Japanese Patent Application No. 2021-029057 filed on Feb. 25, 2021. The contents of the prior applications are hereby incorporated by reference in their entirety.

BACKGROUND

1. Technical Field

The present disclosure relates to an authentication device to be mounted on a vehicle, and also relates to a method, a non-transitory storage medium, and a vehicle.

2. Description of Related Art

Japanese Unexamined Patent Application Publication No. 2018-062306 (JP 2018-062306 A) discloses an authentication system configured to execute user authentication by combining verification of an electronic key (mobile device) of a user and authentication of biometric information of the user (for example, a face, a fingerprint, an iris, or a vein) to keep security against theft of a vehicle or the like. In the authentication system described in JP 2018-062306 A, new biometric information can be registered or existing biometric information can be deleted after the authentication using the biometric information is successful.

Japanese Unexamined Patent Application Publication No. 2020-024536 (JP 2020-024536 A) discloses an authentication system configured to repeat authentication using biometric information (biometric authentication) to increase security of authentication. In the authentication system described in JP 2020-024536 A, even after first biometric authentication for the start of an engine or the like is successful, operations of switching ON or OFF a biometric authentication function and registering or deleting biometric information are permitted under a condition that second biometric authentication is successful.

SUMMARY

In the authentication system using biometric information, biometric authentication using registered specific biometric information may be unsuccessful when the specific biometric information that is registered cannot be used for some reason, as typified by a case where a finger registered for fingerprint information cannot be used due to injury.

In the authentication systems described in JP 2018-062306 A and JP 2020-024536 A, there is a possibility that the biometric authentication function cannot be switched from ON to OFF when only unusable specific biometric information is registered in the authentication systems.

The present disclosure provides an authentication device, a method, a non-transitory storage medium, and a vehicle in which an operation of switching OFF a biometric authentication function can be performed even in a case where registered specific biometric information cannot be used when the biometric authentication function is ON.

A first aspect of a technology of the present disclosure relates to an authentication device to be mounted on a vehicle. The authentication device includes a processor. The processor is configured to execute first authentication based on biometric information acquired from a user and biometric information preregistered in the vehicle. The processor is configured to execute second authentication based on identification information acquired from a mobile device of the user and identification information preregistered in the vehicle. The processor is configured to permit start of the vehicle when at least one of the first authentication and the second authentication is successful. The processor is configured to set an authentication function of the first authentication from ON to OFF when at least one of the first authentication and the second authentication is successful.

In the authentication device according to the first aspect of the present disclosure, the processor may be configured to, when the authentication function of the first authentication is set to OFF, notify the user that the authentication function of the first authentication is set to OFF.

In the authentication device according to the first aspect of the present disclosure, the processor may be configured to notify the user that the authentication function of the first authentication is set to OFF before a first period passes since the authentication function of the first authentication was set to OFF.

In the authentication device according to the first aspect of the present disclosure, the processor may be configured to cause a display device of the vehicle to display information for notifying the user that the authentication function of the first authentication is set to OFF until a second period passes since the vehicle made transition from a started state to a stopped state.

A second aspect of the technology of the present disclosure relates to an authentication method to be executed by a computer of an authentication device to be mounted on a vehicle. The authentication method includes executing first authentication based on biometric information acquired from a user and biometric information preregistered in the vehicle, executing second authentication based on identification information acquired from a mobile device of the user and identification information preregistered in the vehicle, permitting start of the vehicle when at least one of the first authentication and the second authentication is successful, and setting an authentication function of the first authentication from ON to OFF when at least one of the first authentication and the second authentication is successful.

A third aspect of the technology of the present disclosure relates to a non-transitory storage medium storing instructions that are executable by one or more computers of an authentication device and that cause the one or more computers to perform functions. The authentication device is mounted on a vehicle. The functions include executing first authentication based on biometric information acquired from a user and biometric information preregistered in the vehicle, executing second authentication based on identification information acquired from a mobile device of the user and identification information preregistered in the vehicle, permitting start of the vehicle when at least one of the first authentication and the second authentication is successful, and setting an authentication function of the first authentication from ON to OFF when at least one of the first authentication and the second authentication is successful.

The authentication device according to the first aspect of the technology of the present disclosure may be mounted on a vehicle.

With the authentication device, the method, the non-transitory storage medium, and the vehicle of the present disclosure, the operation of switching OFF the biometric authentication function can be performed even in the case where the registered specific biometric information cannot be used when the biometric authentication function is ON.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

When biometric authentication based on biometric information of a user and biometric information registered in a vehicle has failed, an authentication device of the present disclosure then executes identification (ID) authentication through transponder communication based on identification information of an electronic key (mobile device) of the user and identification information registered in the vehicle. When the ID authentication is successful, the authentication device permits cancellation of a biometric authentication function. Thus, the user can cancel the biometric authentication function. An embodiment of the present disclosure is described below in detail with reference to the drawings.

Embodiment

Configuration

Figure 1:
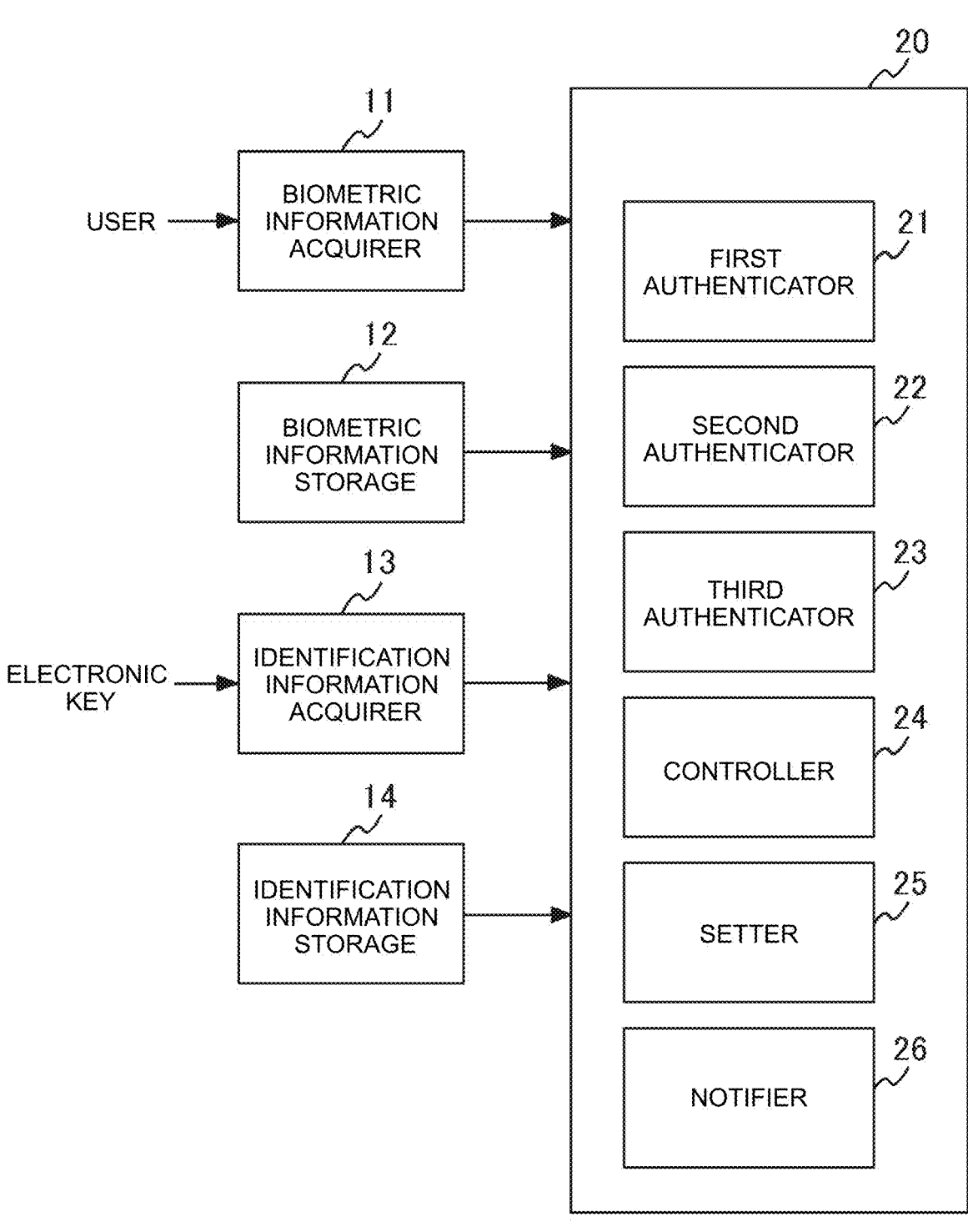
FIG. 1 is a functional block diagram of an authentication device and its peripheral components according to an embodiment of the present disclosure.

FIG. 1 is a functional block diagram of an authentication device 20 and its peripheral components according to the embodiment of the present disclosure. The functional blocks illustrated in FIG. 1 include a biometric information acquirer 11, a biometric information storage 12, an identification information acquirer 13, an identification information storage 14, and the authentication device 20. The authentication device 20 according to this embodiment is mounted on a vehicle such as a passenger car.

In the following embodiment, the present disclosure is described taking an example in which a user who requests the authentication device 20 to execute an authentication process to use the vehicle, accesses the authentication device 20 while carrying an electronic key assigned to the vehicle. A smartphone, a mobile phone, or a card key may be used in place of the electronic key.

The biometric information acquirer 11 can acquire human biometric information. More specifically, the biometric information acquirer 11 acquires biometric information from a user who uses the vehicle. The biometric information can be read by a predetermined reading device (not illustrated) arranged inside or outside a vehicle cabin. This embodiment is directed to a case where a fingerprint is used as the biometric information. For example, a human face or voice print may be used instead. The biometric information acquired by the biometric information acquirer 11 is output to the authentication device 20.

In a case where the authentication device 20 is applied to the vehicle, the reading device may be a fingerprint sensor integrated with a push start switch to be used for starting or stopping an engine or a power supply system of the vehicle. The push start switch detects its depression and switches its internal state between ON and OFF. A fingerprint reading part of the fingerprint sensor is provided on the surface of the push start switch. For example, the fingerprint sensor can execute a fingerprint detection process when the push start switch is depressed by a finger. There is no limitation on a method for the fingerprint detection process of the fingerprint sensor. Examples of the fingerprint detection process include a fingerprint detection process in which, when a finger comes into contact with the fingerprint reading part, a ridge and groove pattern of the finger is captured and detected as a fingerprint.

The biometric information storage 12 stores registered valid biometric information (fingerprint) of a user having authority to operate the vehicle. The biometric information is registered by the user via, for example, a predetermined customization screen on which the setting on a biometric authentication function of the authentication device 20 can be manipulated. For example, the customization screen can be activated by using a user-specific account when biometric information is registered for the first time, and can be activated by success in biometric authentication (described later) when at least one piece of biometric information has been registered. The biometric information stored in the biometric information storage 12 is output to the authentication device 20 as appropriate.

The identification information acquirer 13 can acquire key-specific identification information transmitted from an electronic key of a user. The identification information is unique information that can distinguish the user's electronic key from other electronic keys, and the type and format of the information are not particularly limited. For example, the identification information acquirer 13 of this embodiment acquires the identification information from the electronic key through wireless communication with one or more radio antennas mounted on the vehicle, or acquires the identification information from the electronic key brought close to the push start switch through transponder communication. The identification information acquired by the identification information acquirer 13 is output to the authentication device 20.

The identification information storage 14 stores one or more pieces of identification information (for example, key IDs) for identifying valid electronic keys for permitting to control the vehicle. The identification information of the electronic key is preregistered by an authorized operator. The identification information stored in the identification information storage 14 is output to the authentication device 20 as appropriate.

In the example described above, the biometric information acquirer 11, the biometric information storage 12, the identification information acquirer 13, and the identification information storage 14 are provided separately from the authentication device 20, but may partially or entirely be provided in the authentication device 20.

The authentication device 20 can execute biometric authentication using biometric information (fingerprint) of a user, and ID authentication using identification information of an electronic key of the user. The authentication device 20 can notify the user based on results of the biometric authentication and the ID authentication. The authentication device 20 includes a first authenticator 21, a second authenticator 22, a third authenticator 23, a controller 24, a setter 25, and a notifier 26.

The first authenticator 21 executes first authentication (biometric authentication) for authenticating a user by verifying biometric information (fingerprint) of the user that is acquired by the biometric information acquirer 11 against one or more pieces of biometric information (fingerprints) stored in the biometric information storage 12. For example, the first authenticator 21 can determine that fingerprint authentication is successful when the degree of match between the acquired fingerprint and any stored fingerprint is equal to or higher than a predetermined degree.

The second authenticator 22 executes second authentication (transponder authentication) for determining whether an electronic key is valid by verifying identification information of the electronic key that is acquired by the identification information acquirer 13 through short-range communication using a transponder in the electronic key against one or more pieces of identification information stored in the identification information storage 14. For example, the second authenticator 22 can determine that key ID authentication is successful when the key ID acquired through the transponder communication and any stored key ID have a match. The authentication by the second authenticator 22 is executed when the authentication by the first authenticator 21 or authentication by the third authenticator 23 is unsuccessful.

The third authenticator 23 executes third authentication (smart authentication) for determining whether an electronic key is valid by verifying identification information of the electronic key that is acquired by the identification information acquirer 13 through wireless communication with one or more radio antennas mounted on the vehicle against one or more pieces of identification information stored in the identification information storage 14. For example, the third authenticator 23 can determine that key ID authentication is successful when the key ID acquired through the wireless communication using a smart function and any stored key ID have a match. The authentication by the third authenticator 23 is executed when the first authentication (biometric authentication) function is OFF.

The controller 24 controls permission or forbiddance of vehicle operation by a user and an operation status of the vehicle (start or stop) when the authentication by the first authenticator 21 or the second authenticator 22 is successful. Since this embodiment is directed to the example in which the fingerprint sensor is arranged on the push start switch, permission for the start of the vehicle as vehicle control can be exemplified. The start of the vehicle means that an ignition (IG) switch of the vehicle is ON or an operation status of each device related to traveling of the vehicle is a started state. The stop of the vehicle means that the ignition switch of the vehicle is OFF or the operation status of each device related to traveling of the vehicle is a stopped state. The controller 24 can control a flag indicating whether to execute a notification process by the notifier 26 based on an authentication result from the first authenticator 21.

The setter 25 can set an ON state in which the function of authentication using biometric information of a user is used, or an OFF state in which the function is not used. That is, the setter 25 can set ON/OFF of the authentication function of the first authenticator 21. Specifically, when the authentication function of the first authenticator 21 is set to OFF, the first authenticator 21 does not execute the authentication using biometric information though a user depresses the push start switch. Based on authentication results from the first authenticator 21 and the second authenticator 22, the setter 25 can control access to the customization screen on which the setting on the ON/OFF of the authentication function of the first authenticator 21 can be manipulated.

The notifier 26 issues a predetermined notification to a user based on authentication results from the first authenticator 21 and the second authenticator 22. A notification method and details of notification to be executed by the notifier 26 are described later.

The authentication device 20 may partially or entirely be provided as an electronic control unit (ECU) typically including a processor, a memory, and an input/output interface. The authentication device 20 of this embodiment implements all or part of the functions of the first authenticator 21, the second authenticator 22, the third authenticator 23, the controller 24, the setter 25, and the notifier 26 by the processor reading and executing programs stored in the memory.

Control

Figure 6:
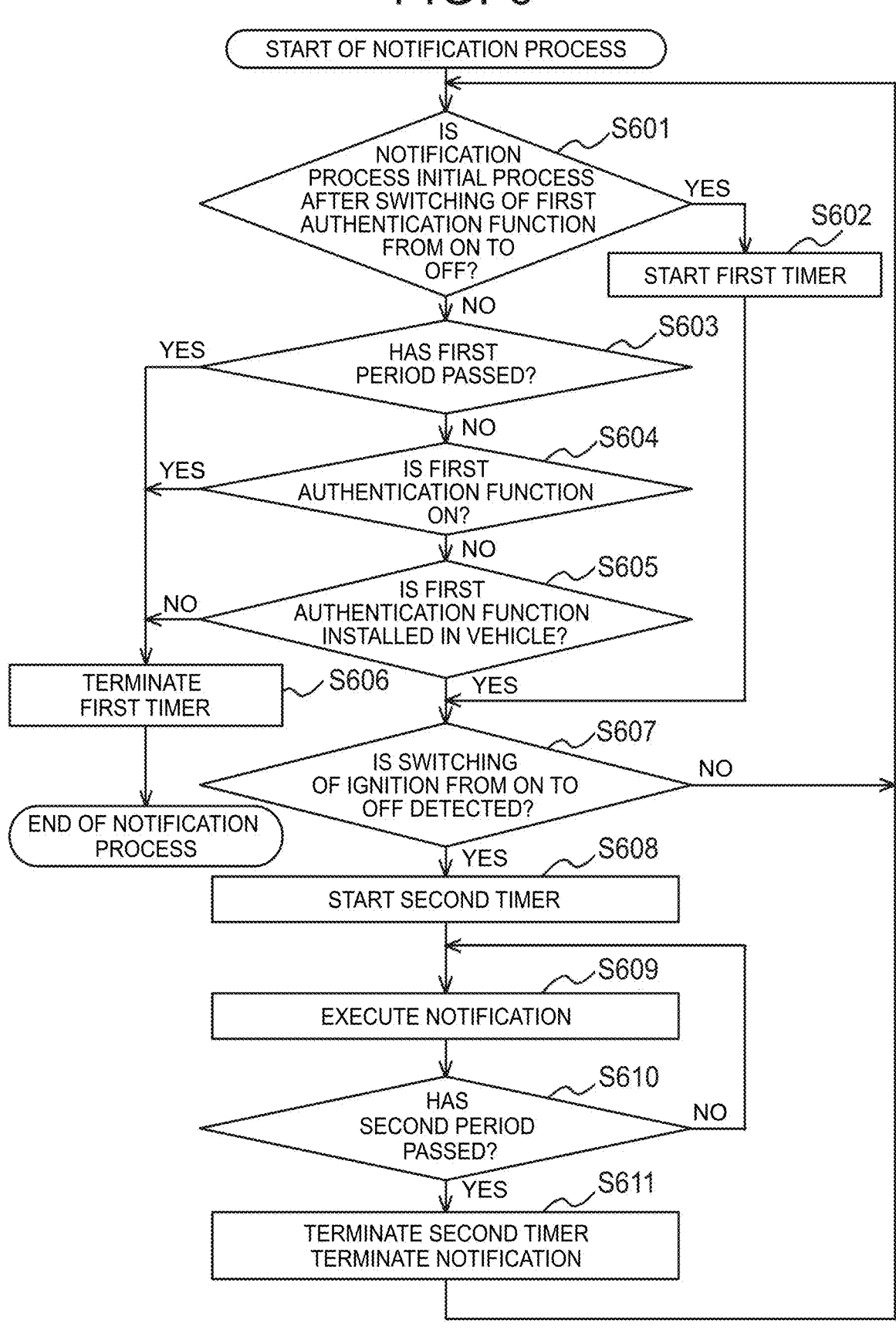
FIG. 6 is a flowchart for describing a procedure of a notification process to be executed by a notifier of the authentication device.
Figure 7:
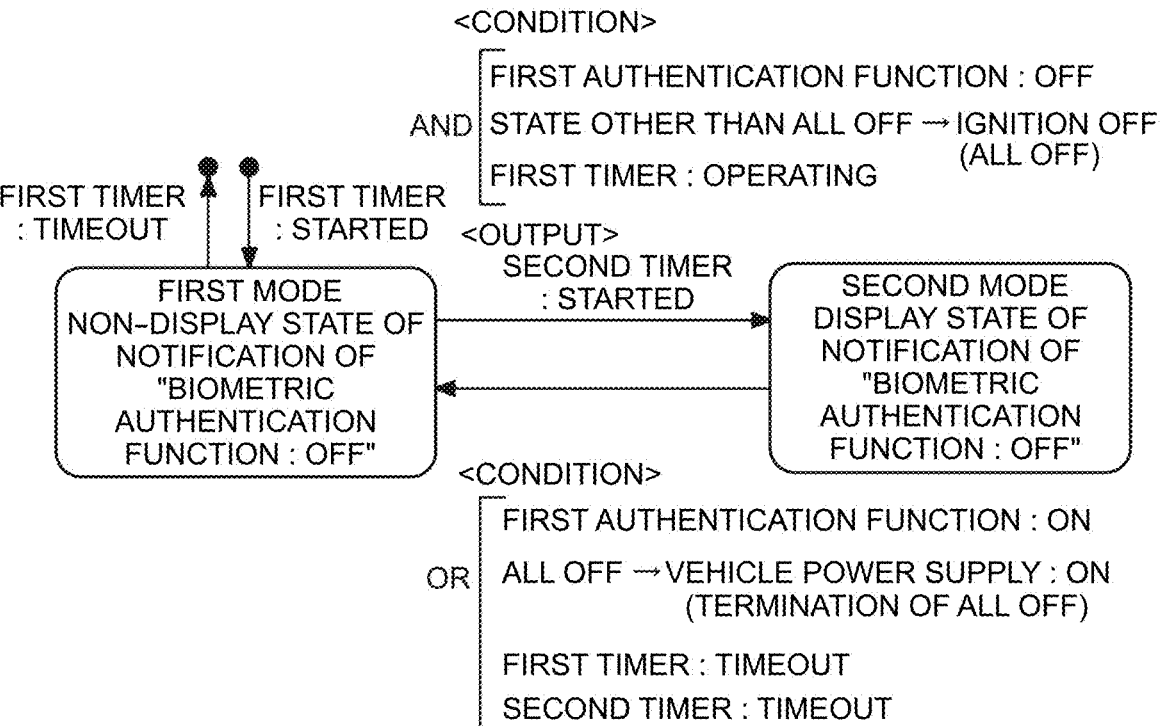
FIG. 7 illustrates an example of a state transition diagram related to the notification process.

Processes to be executed by the authentication device 20 according to this embodiment are described with reference to FIG. 2 to FIG. 7. FIG. 2 to FIG. 5 are flowcharts for describing procedures of authentication processes in first to fourth examples to be executed by the components of the authentication device 20. FIG. 6 is a flowchart for describing a procedure of the notification process to be executed by the notifier 26 of the authentication device 20. FIG. 7 illustrates an example of a state transition diagram related to the notification process.

(1) Authentication Process (First Example)

Figure 2:
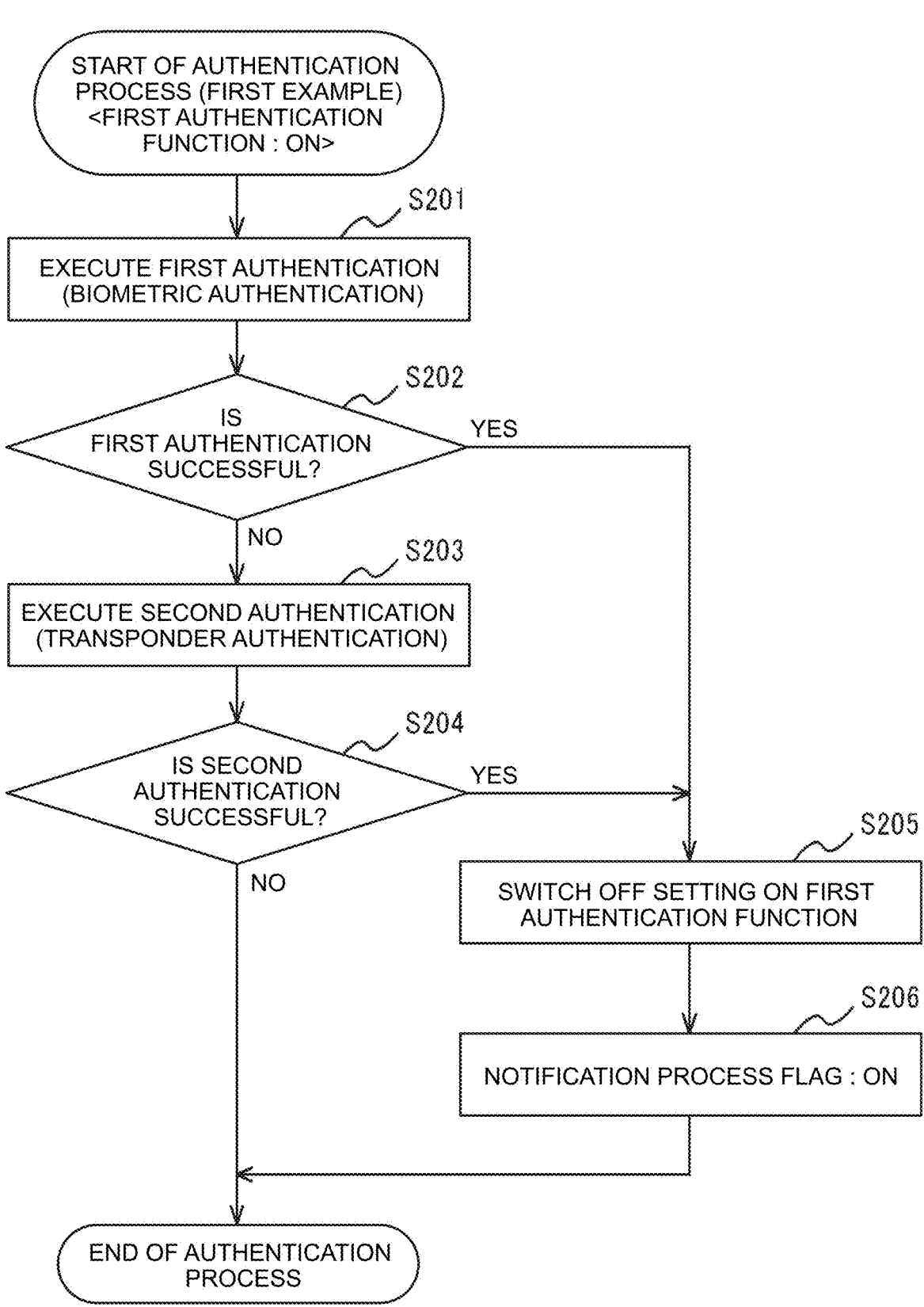
FIG. 2 is a flowchart for describing a procedure of an authentication process (first example) to be executed by components of the authentication device.

The authentication process (first example) illustrated in FIG. 2 relates to a setting change for the authentication function in a case where a user gives an explicit instruction to set the first authentication function (biometric authentication function) to OFF. The first example is started in response to depression of the push start switch by the user in a state in which the vehicle is not operating (IG-OFF or READY-OFF state) when the first authentication function (biometric authentication function) is set to ON.

Step S201

The first authenticator 21 executes the first authentication (biometric authentication) for authenticating the user by verifying biometric information (fingerprint) of the user that is acquired by the biometric information acquirer 11 against one or more pieces of biometric information (fingerprints) stored in the biometric information storage 12. When the first authentication is executed, the process proceeds to Step S202.

Step S202

The first authenticator 21 determines whether the first authentication (biometric authentication) is successful as a result of the verification of the biometric information (fingerprint). When the first authentication is successful (S202: YES), the process proceeds to Step S205. When the first authentication has failed (S202: NO), the process proceeds to Step S203.

Step S203

The second authenticator 22 executes the second authentication (transponder authentication) for determining whether an electronic key is valid by verifying identification information of the electronic key that is acquired by the identification information acquirer 13 against one or more pieces of identification information stored in the identification information storage 14. When executing the second authentication, the authentication device 20 can present, to the user via, for example, a predetermined display or audio device mounted on the vehicle, information for notifying the user that the authentication using the biometric information has failed or information for prompting the user to bring the electronic key of the user close to a predetermined position (for example, the surface of the push start switch) where the identification information is acquirable. When the second authentication is executed, the process proceeds to Step S204.

Step S204

The second authenticator 22 determines whether the second authentication (transponder authentication) is successful as a result of the verification of the identification information. When the second authentication has failed (S204: NO), the authentication process (first example) is terminated. When the second authentication is successful (S204: YES), the process proceeds to Step S205.

Step S205

The setter 25 switches OFF the setting on the first authentication function (biometric authentication function) of the first authenticator 21 (cancels the function). More specifically, the setter 25 sets the first authentication function from ON to OFF when the first authentication (biometric authentication) in Step S201 is successful or the second authentication (transponder authentication) in Step S203 is successful. When the first authentication function is set to OFF, the process proceeds to Step S206.

Step S206

The controller 24 sets a notification process flag to ON. The notification process flag indicates whether to execute the notification process by the notifier 26. When the notification process flag is ON, the notification process illustrated in FIG. 6 is executed. When the notification process flag is set to ON, the authentication process (first example) is terminated.

In the authentication process (first example) described above, in the case where the user gives an explicit instruction to set the first authentication function (biometric authentication function) to OFF, the first authentication (biometric authentication) function can be set to OFF when the biometric authentication by the first authenticator 21 or the ID authentication (transponder authentication) by the second authenticator 22 is successful.

(2) Authentication Process (Second Example)

Figure 3:
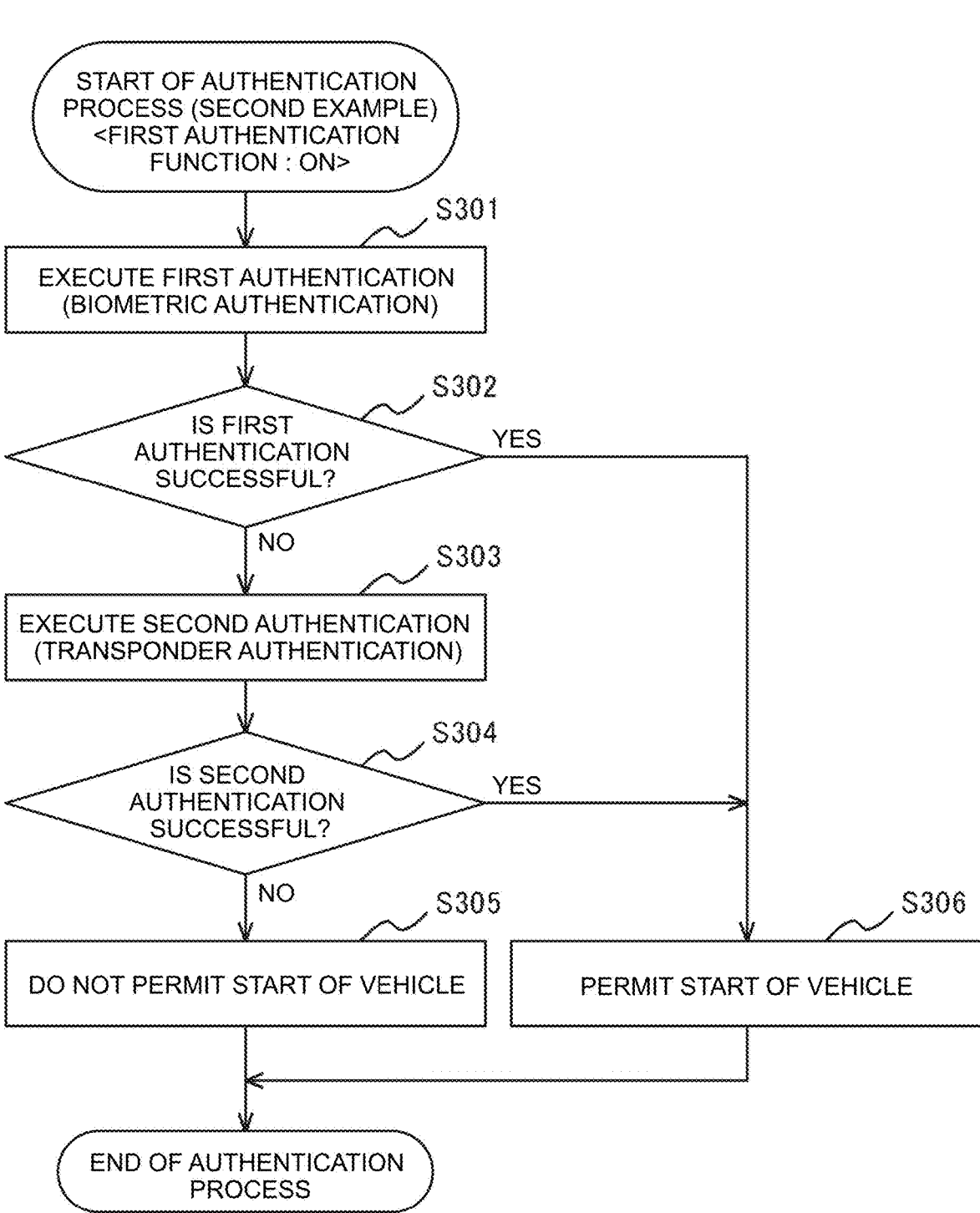
FIG. 3 is a flowchart for describing a procedure of an authentication process (second example) to be executed by the components of the authentication device.

The authentication process (second example) illustrated in FIG. 3 relates to authentication for starting the vehicle when the first authentication function (biometric authentication function) is set to ON. The second example is started in response to depression of the push start switch by a user in a state in which the vehicle is not operating (IG-OFF or READY-OFF state).

Step S301

The first authenticator 21 executes the first authentication (biometric authentication) for authenticating the user by verifying biometric information (fingerprint) of the user that is acquired by the biometric information acquirer 11 against one or more pieces of biometric information (fingerprints) stored in the biometric information storage 12. When the first authentication is executed, the process proceeds to Step S302.

Step S302

The first authenticator 21 determines whether the first authentication (biometric authentication) is successful as a result of the verification of the biometric information (fingerprint). When the first authentication is successful (S302: YES), the process proceeds to Step S306. When the first authentication has failed (S302: NO), the process proceeds to Step S303.

Step S303

The second authenticator 22 executes the second authentication (transponder authentication) for determining whether an electronic key is valid by verifying identification information of the electronic key that is acquired by the identification information acquirer 13 against one or more pieces of identification information stored in the identification information storage 14. When executing the second authentication, the authentication device 20 can present, to the user via, for example, the predetermined display or audio device mounted on the vehicle, information for notifying the user that the authentication using the biometric information has failed or information for prompting the user to bring the electronic key of the user close to the predetermined position (for example, the surface of the push start switch) where the identification information is acquirable. When the second authentication is executed, the process proceeds to Step S304.

Step S304

The second authenticator 22 determines whether the second authentication (transponder authentication) is successful as a result of the verification of the identification information. When the second authentication is successful (S304: YES), the process proceeds to Step S306. When the second authentication has failed (S304: NO), the process proceeds to Step S305.

Step S305

The controller 24 does not permit the start of the vehicle as the vehicle control because (the authentication by the first authenticator 21 has failed and also) the authentication by the second authenticator 22 has failed. When the start of the vehicle is not permitted, the authentication process (second example) is terminated.

Step S306

The controller 24 permits the start of the vehicle as the vehicle control because (the authentication by the first authenticator 21 has failed but) the authentication by the second authenticator 22 is successful. When the start of the vehicle is permitted, the authentication process (second example) is terminated.

In the authentication process (second example) described above, in the case where the first authentication function (biometric authentication function) is set to ON, the start of the vehicle is permitted when the biometric authentication by the first authenticator 21 is successful or when the ID authentication (transponder authentication) by the second authenticator 22 is successful though the biometric authentication by the first authenticator 21 has failed. Through this process, the user can start the vehicle without problems even if the biometric information cannot be used for some reason.

(3) Authentication Process (Third Example)

Figure 4:
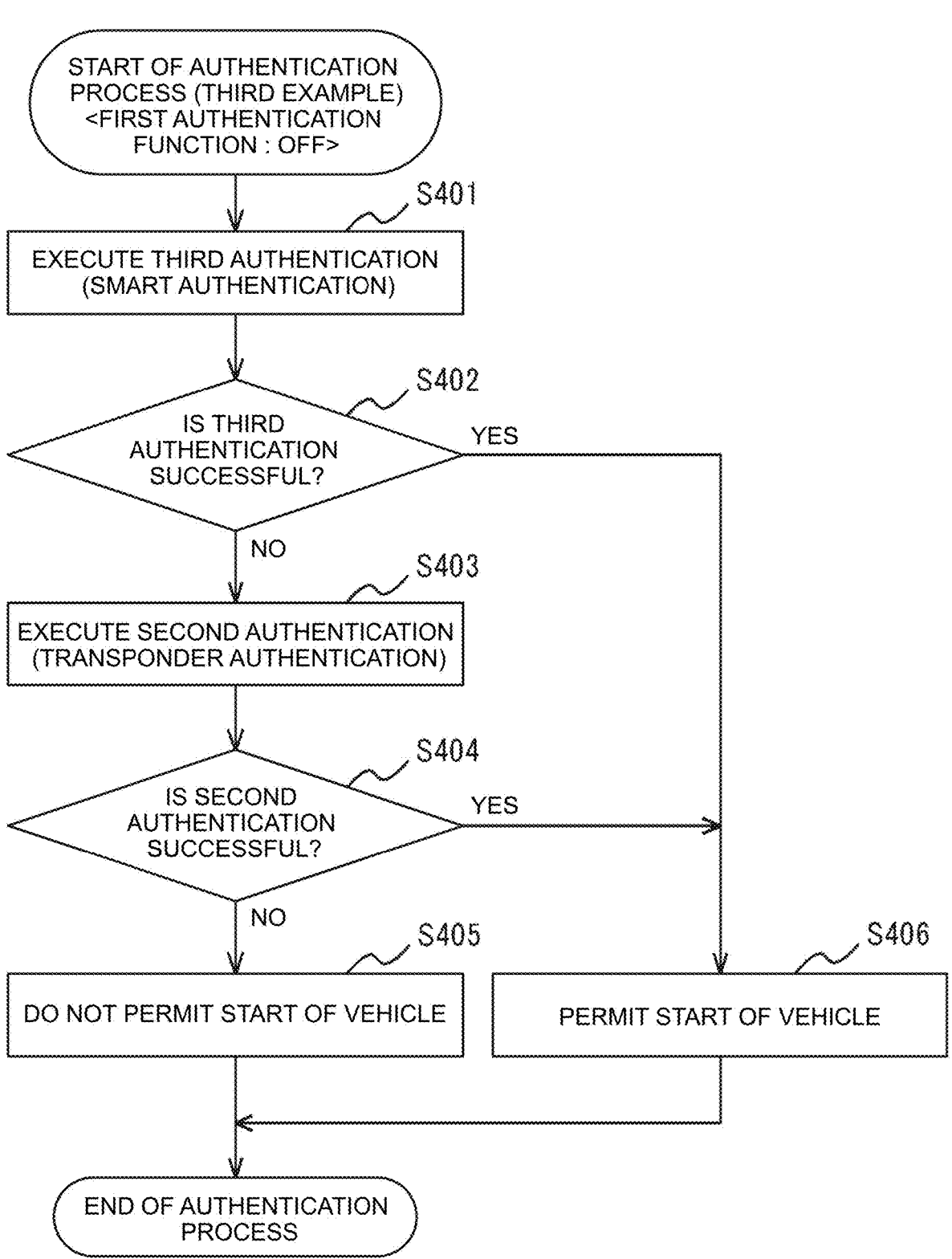
FIG. 4 is a flowchart for describing a procedure of an authentication process (third example) to be executed by the components of the authentication device.

The authentication process (third example) illustrated in FIG. 4 is an example that relates to authentication for starting the vehicle when the first authentication function (biometric authentication function) is set to OFF. The third example is started in response to depression of the push start switch by a user in a state in which the vehicle is not operating (IG-OFF or READY-OFF state).

Step S401

The third authenticator 23 executes the third authentication (smart authentication) for determining whether an electronic key is valid by verifying identification information of the electronic key that is acquired by the identification information acquirer 13 through wireless communication using the smart function against one or more pieces of identification information stored in the identification information storage 14. In the third authentication (smart authentication), whether a valid electronic key is present in the vehicle may be used as a determination criterion. When the third authentication is executed, the process proceeds to Step S402.

Step S402

The third authenticator 23 determines whether the third authentication (smart authentication) is successful as a result of the verification of the identification information. When the third authentication is successful (S402: YES), the process proceeds to Step S406. When the third authentication has failed (S402: NO), the process proceeds to Step S403.

Step S403

The second authenticator 22 executes the second authentication (transponder authentication) for determining whether the electronic key is valid by verifying the identification information of the electronic key that is acquired by the identification information acquirer 13 through transponder communication against one or more pieces of identification information stored in the identification information storage 14. In the second authentication (transponder authentication), whether a valid electronic key is present in the vehicle may be used as a determination criterion. When the second authentication is executed, the process proceeds to Step S404.

Step S404

The second authenticator 22 determines whether the second authentication (transponder authentication) is successful as a result of the verification of the identification information. When the second authentication is successful (S404: YES), the process proceeds to Step S406. When the second authentication has failed (S404: NO), the process proceeds to Step S405.

Step S405

The controller 24 does not permit the start of the vehicle as the vehicle control because both the authentication by the third authenticator 23 and the authentication by the second authenticator 22 have failed. When the start of the vehicle is not permitted, the authentication process (third example) is terminated.

Step S406

The controller 24 permits the start of the vehicle as the vehicle control because the authentication by the third authenticator 23 or the authentication by the second authenticator 22 is successful. When the start of the vehicle is permitted, the authentication process (third example) is terminated.

In the authentication process (third example) described above, in the case where the first authentication function (biometric authentication function) is set to OFF, the start of the vehicle is permitted when at least one of the ID authentication (smart authentication) by the third authenticator 23 or the ID authentication (transponder authentication) by the second authenticator 22 is successful. Through this process, the user can start the vehicle without problems even if the biometric information cannot be used for some reason.

(4) Authentication Process (Fourth Example)

Figure 5:
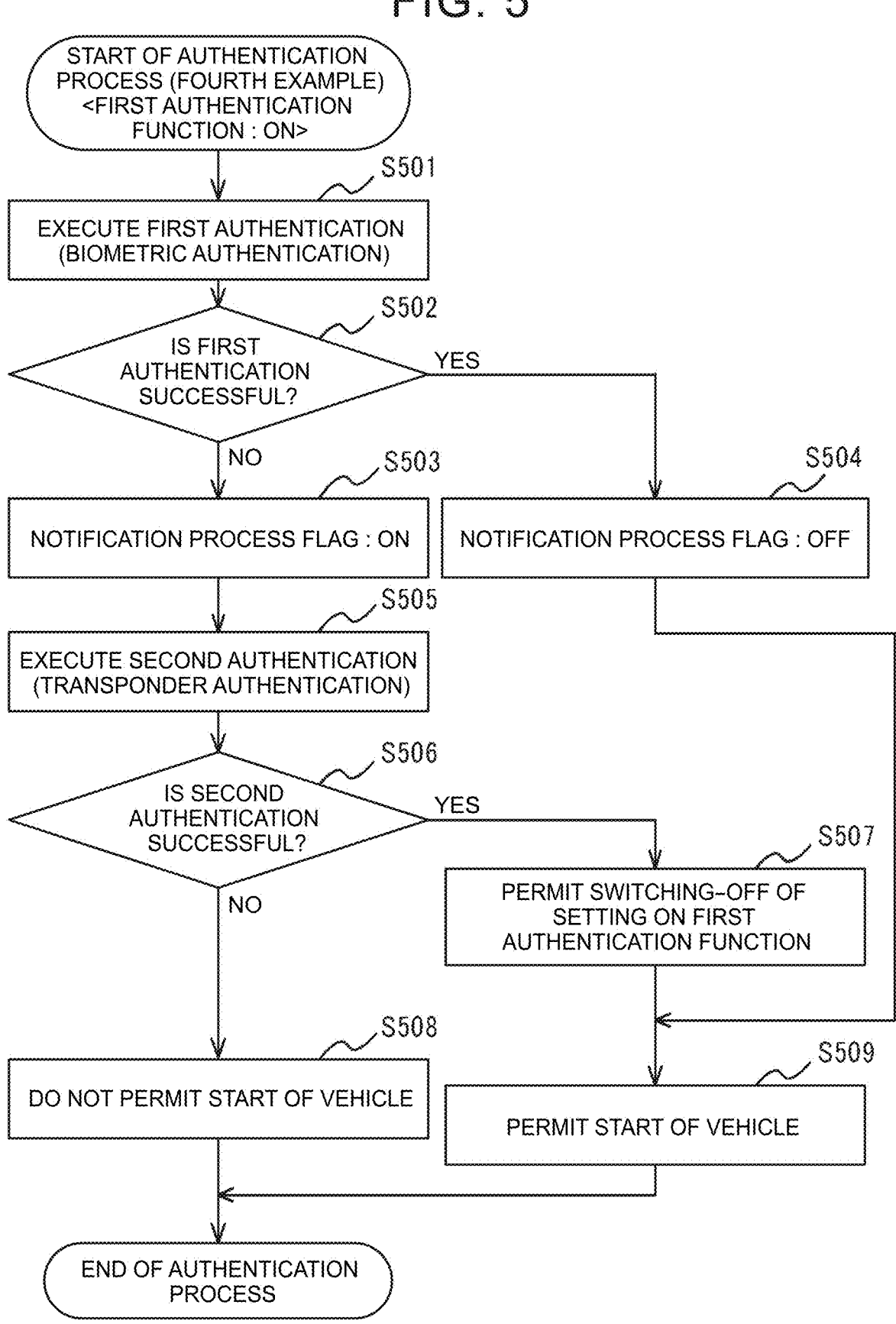
FIG. 5 is a flowchart for describing a procedure of an authentication process (fourth example) to be executed by the components of the authentication device.

The authentication process (fourth example) illustrated in FIG. 5 relates to authentication for starting the vehicle when the first authentication function (biometric authentication function) is set to ON. The fourth example is started in response to depression of the push start switch by a user in a state in which the vehicle is not operating (IG-OFF or READY-OFF state).

Step S501

The first authenticator 21 executes the first authentication (biometric authentication) for authenticating the user by verifying biometric information (fingerprint) of the user that is acquired by the biometric information acquirer 11 against one or more pieces of biometric information (fingerprints) stored in the biometric information storage 12. When the first authentication is executed, the process proceeds to Step S502.

Step S502

The first authenticator 21 determines whether the first authentication (biometric authentication) is successful as a result of the verification of the biometric information (fingerprint). When the first authentication is successful (S502: YES), the process proceeds to Step S504. When the first authentication has failed (S502: NO), the process proceeds to Step S503.

Step S503

The controller 24 sets the notification process flag to ON. The notification process flag indicates whether to execute the notification process by the notifier 26. When the notification process flag is ON, the notification process illustrated in FIG. 6 is executed. When the notification process flag is set, the process proceeds to Step S505.

Step S504

The controller 24 sets the notification process flag to OFF. The notification process flag indicates whether to execute the notification process by the notifier 26. When the notification process flag is OFF, the notification process illustrated in FIG. 6 is not executed. When the notification process flag is set, the process proceeds to Step S509.

Step S505

The second authenticator 22 executes the second authentication (transponder authentication) for determining whether an electronic key is valid by verifying identification information of the electronic key that is acquired by the identification information acquirer 13 against one or more pieces of identification information stored in the identification information storage 14. When executing the second authentication, the authentication device 20 can present, to the user via, for example, the predetermined display or audio device mounted on the vehicle, information for notifying the user that the authentication using the biometric information has failed or information for prompting the user to bring the electronic key of the user close to the predetermined position (for example, the surface of the push start switch) where the identification information is acquirable. When the second authentication is executed, the process proceeds to Step S506.

Step S506

The second authenticator 22 determines whether the second authentication (transponder authentication) is successful as a result of the verification of the identification information. When the second authentication is successful (S506:

YES), the process proceeds to Step S507. When the second authentication has failed (S506: NO), the process proceeds to Step S508.

When the second authentication (transponder authentication) has failed in Step S506, the authentication device 20 may present, to the user via, for example, the predetermined display or audio device mounted on the vehicle, information for notifying the user that both the authentication using the biometric information and the authentication using the identification information of the electronic key have failed.
Step S507

The setter 25 permits switching-OFF of the setting on the first authentication function (biometric authentication function) of the first authenticator 21 (cancellation of the function). More specifically, when the second authentication (transponder authentication) is successful in Step S506, the setter 25 activates the customization screen on which the setting on the ON/OFF of the first authentication function can be manipulated, and causes the display to display the customization screen. By operating an icon in the customization screen displayed on the display, the user can set the first authentication function from ON to OFF without the need for success in the biometric authentication again. When the switching-OFF of the setting on the first authentication function is permitted, the process proceeds to Step S509.
Step S508

The controller 24 does not permit the start of the vehicle as the vehicle control because (the authentication by the first authenticator 21 has failed and also) the authentication by the second authenticator 22 has failed. When the start of the vehicle is not permitted, the authentication process is terminated.
Step S509

The controller 24 permits the start of the vehicle as the vehicle control because (the authentication by the first authenticator 21 has failed but) the authentication by the second authenticator 22 is successful. When the start of the vehicle is permitted, the authentication process is terminated.

In the authentication process (fourth example) described above, the start of the vehicle is permitted when the biometric authentication by the first authenticator 21 is successful or when the ID authentication (transponder authentication) by the second authenticator 22 is successful though the biometric authentication by the first authenticator 21 has failed. Through this process, the user can start the vehicle without problems even if the biometric information cannot be used for some reason.

When the first authentication (biometric authentication) by the first authenticator 21 has failed and then the second authentication (transponder authentication) by the second authenticator 22 is successful, the switching-OFF of the setting on the first authentication function (biometric authentication function) of the first authenticator 21 (cancellation of the function) is permitted. Through this process, the user can switch OFF the setting on the first authentication function when the biometric information cannot be used for some reason, and can start the vehicle next time only through the second authentication (transponder authentication) by the second authenticator 22.

In the authentication process (fourth example) illustrated in FIG. 5, description is given of the example in which the second authentication (transponder authentication) is immediately executed, at once the first authentication (biometric authentication) has failed in Step S502. However, the first authentication (biometric authentication) may be executed multiple times, and the second authentication (transponder authentication) may be executed, for example, when all attempts for the authentication have failed or an authentication failure count exceeds a predetermined value. When the user re-executes the first authentication (biometric authentication) and the authentication is successful while requesting the second authentication (transponder authentication) in Step S506, the process of Step S509 may be executed without executing the process of Step S507. Through this process, it is possible to reduce influence of failure in the first authentication (biometric authentication) due to, for example, temporary soil on the finger.

In Step S507, description is given of the example of permission for manual switching-OFF of the setting on the first authentication function (biometric authentication function) of the first authenticator 21. The setting on the first authentication function of the first authenticator 21 may automatically be switched OFF. Through this process, inconvenience of setting by the user can be reduced.

Description is given of the example in which the process of Step S509 is executed after the process of Step S507 when the first authentication (biometric authentication) by the first authenticator 21 has failed and then the second authentication (transponder authentication) by the second authenticator 22 is successful. However, the order of the process of Step S507 and the process of Step S509 may be changed. For example, permission is given to set the first authentication function from ON to OFF by activating the customization screen through a user's operation after the vehicle is started by the success in the second authentication (transponder authentication). In this case, the second authentication (transponder authentication) may be requested again when the activation of the customization screen is requested through the user's operation, and the customization screen may be activated when the second authentication (transponder authentication) is successful. Through this process, it is possible to reduce a possibility that the first authentication function is switched OFF through an operation of a third person after the start of the vehicle.

(5) Notification Process

The notification process illustrated in FIG. 6 is started when the notification process flag is set to ON in the authentication process illustrated in FIG. 2 or FIG. 5.
Step S601

The notifier 26 determines whether the notification process is executed for the first time (initial process) since the setter 25 switched the setting on the first authentication function (biometric authentication function) of the first authenticator 21 from ON to OFF. For example, this determination can be made based on a result of comparison between a setting condition of the setter 25 in a previous process and a setting condition of the setter 25 in a current process. When the notification process is the initial process after the switching of the setting on the first authentication function from ON to OFF (S601: YES), the process proceeds to Step S602. When the notification process is not the initial process after the switching of the setting on the first authentication function from ON to OFF (S601: NO), the process proceeds to Step S603.
Step S602

The notifier 26 starts to count a timer for measuring a first period (hereinafter referred to as "first timer") (starts the first timer). The first period defines a period in which the notification described later can be executed, and can be set to, for example, 10 days appropriately based on the frequency of use of the vehicle by the user. When the first timer is started, the process proceeds to Step S607.

Step S603

The notifier 26 determines whether a period measured by the first timer started in the initial process has passed over the first period from the start of time measurement. When the first period has passed (S603: YES), the process proceeds to Step S606. When the first period has not passed (S603: NO), the process proceeds to Step S604.

Step S604

The notifier 26 determines whether the setter 25 sets the first authentication function (biometric authentication function) of the first authenticator 21 to ON. That is, the notifier 26 determines whether the setting on the first authentication function is switched from ON to OFF and then switched from OFF to ON again. For example, this determination can be made by storing setting conditions of the setter 25. When the first authentication function is set to ON (S604: YES), the process proceeds to Step S606. When the first authentication function is set to OFF (S604: NO), the process proceeds to Step S605.

Step S605

The notifier 26 determines whether the first authentication function (biometric authentication function) of the first authenticator 21 is installed in the vehicle. This determination is made for the following reason. When the ECU related to the authentication device 20 of the vehicle is replaced, there is a possibility that the first authentication function is not installed in an ECU after the replacement. For example, whether the first authentication function is installed in the ECU can be determined based on whether all ID codes indicating an installed state are erased. When the first authentication function is not present (not installed) (S605: NO), the process proceeds to Step S606. When the first authentication function is present (installed) (S605: YES), the process proceeds to Step S607.

Step S606

The notifier 26 terminates the first timer by stopping and resetting the count of the first timer. When the first timer is terminated, the notification process is terminated.

Step S607

The notifier 26 determines whether the vehicle is switched from an ignition-ON state that is the started state to an ignition-OFF state that is the stopped state. This determination corresponds to determination about transition from the started state in which the vehicle is operating (state other than an ALL-OFF state) to the stopped state in which the vehicle is not operating (ALL-OFF state). When the ignition is switched from ON to OFF (S607: YES), the process proceeds to Step S608. When the ignition is not switched from ON to OFF (S607: NO), the process proceeds to Step S601.

Step S608

The notifier 26 starts to count a timer for measuring a second period (hereinafter referred to as "second timer") (starts the second timer). The second period is a period in which the notification described later is continued, and can be set to, for example, 1 minute as an optimum period in which the notification does not annoy the user. When the second timer is started, the process proceeds to Step S609.

Step S609

The notifier 26 executes the predetermined notification. The notification is executed for the purpose of informing the user that the authentication using the first authentication function (biometric authentication function) has failed. Examples of a notification message include "The biometric authentication function is OFF." and "The biometric authentication function is ON but the authentication has failed." For example, the notification can be executed by displaying a text or icon on a screen of a display device such as an information display or by outputting voice via a loudspeaker. When the notification is executed, the process proceeds to Step S610.

Step S610

The notifier 26 determines whether a period measured by the second timer has passed over the second period from the start of time measurement. When the second period has passed (S610: YES), the process proceeds to Step S611. When the second period has not passed (S610: NO), the process proceeds to Step S609.

Step S611

The notifier 26 terminates the second timer by stopping and resetting the count of the second timer. The notifier 26 terminates the notification that is being executed. When the second timer and the notification are terminated, the process proceeds to Step S601.

In the notification process of this embodiment, the notification is continued for the second period measured by the second timer every time the ignition is switched from ON to OFF during the first period measured by the first timer. Through this process, the user can be informed whether authentication using the first authentication function (biometric authentication function) is active or whether authentication using the first authentication function is successful.

An example of state transition related to the notification process is described with reference to FIG. 7. In FIG. 7, the start of the first timer triggers transition to a "first mode" in which the notification that the first authentication function (biometric authentication function) is OFF is executable but has not been executed. When the first authentication function is switched OFF and the ignition of the vehicle is switched OFF before the first timer reaches the first period (timeout), the second timer is started and transition is made to a "second mode" in which the notification that the first authentication function is OFF is displayed. Transition is made to the first mode when the first authentication function is switched ON, the power supply system of the vehicle is switched ON and the ALL-OFF state is terminated, the first timer reaches the first period, or the second timer reaches the second period (timeout) while the notification is being displayed. When the first timer reaches the first period in the first mode, the first mode is terminated.

Actions and Effects

As described above, in the authentication device 20 according to the embodiment of the present disclosure, the first authentication function (biometric authentication function) can be set from ON to OFF when the biometric authentication (first authentication) based on the biometric information acquired from the user and the biometric information preregistered in the vehicle, or the ID authentication (second authentication) based on the identification information acquired from the electronic key (mobile device) of the user and the identification information preregistered in the vehicle is successful.

Through this control, even if the biometric information cannot be used for some reason, the setting on the biometric authentication function (first authentication function) can be switched OFF when the user gives an explicit instruction to set the first authentication function (biometric authentication function) to OFF. Therefore, the user who cannot use the biometric information can start the vehicle next time only through the ID authentication using the electronic key (mobile device) without bothering (for example, calling)

another user who can use biometric information. Thus, user's convenience related to access to the vehicle is improved.

In the authentication device 20 according to the embodiment of the present disclosure, when the biometric authentication (first authentication) based on the biometric information acquired from the user and the biometric information preregistered in the vehicle has failed, the ID authentication (second authentication) based on the identification information acquired from the electronic key (mobile device) of the user and the identification information preregistered in the vehicle is then executed. When the ID authentication is successful, the authentication device 20 is controlled to permit the switching-OFF of the setting on the biometric authentication function (cancellation of the function).

Through this control, even if the biometric information cannot be used for some reason, the user can switch OFF the setting on the biometric authentication function (first authentication function). Therefore, the user who cannot use the biometric information can start the vehicle next time only through the ID authentication using the electronic key (mobile device) without bothering (for example, calling) another user who can use biometric information. Thus, the user's convenience related to access to the vehicle is improved.

In the authentication device 20 according to the embodiment of the present disclosure, when the biometric authentication (first authentication) has failed and then the ID authentication (second authentication) is successful, the notification that the biometric authentication function is OFF is issued to the user continuously for the second period measured by the second timer every time the ignition is switched from ON to OFF during the first period measured by the first timer until the predetermined condition is satisfied.

Through this control, the user can be informed that the biometric authentication function (first authentication function) is OFF. Through this notification, for example, in a case where the biometric authentication function is switched OFF by another person (for example, an acquaintance who has lent the vehicle, a valet parking operator, or a malicious third person) before the user knows, the user can check the status of the biometric authentication function for the predetermined period to know that the biometric authentication function is switched OFF.

The notification that the biometric authentication function (first authentication function) is OFF may be issued to the user continuously for the second period measured by the second timer every time the ignition is switched from OFF to ON.

Although the embodiment of the technology of the present disclosure is described above, the present disclosure can be regarded not only as the authentication device, but also as, for example, an authentication method to be executed by the authentication device including a processor and a memory, a control program for the authentication method, a non-transitory computer-readable recording medium storing the control program, or a vehicle including the authentication device.

The present disclosure is useful for an authentication device to be mounted on a vehicle or the like and configured to authenticate a user by using biometric information.

What is claimed is:

1. An authentication device to be mounted on a vehicle, the authentication device comprising a processor configured to:

execute first authentication based on biometric information acquired from a user and biometric information preregistered in the vehicle;
execute second authentication different from the first authentication; and
in response to the second authentication being successful, change a setting of the first authentication to a state that allows the user to modify the setting of the first authentication.

2. The authentication device according to claim 1, wherein the state in which the user is able to change the setting is a state in which the user is able to set an authentication function of the first authentication from ON to OFF.

3. The authentication device according to claim 1, wherein the processor is further configured to execute the second authentication when the first authentication is not successful.

4. The authentication device according to claim 1, wherein the processor is further configured to execute the second authentication based on identification information acquired from a mobile device of the user and identification information preregistered in the vehicle.

5. The authentication device according to claim 2, wherein the processor is configured to, when the authentication function of the first authentication is set to OFF, notify the user that the authentication function of the first authentication is set to OFF.

6. The authentication device according to claim 5, wherein the processor is configured to notify the user that the authentication function of the first authentication is set to OFF before a first period passes since the authentication function of the first authentication was set to OFF.

7. The authentication device according to claim 5, wherein the processor is configured to cause a display device of the vehicle to display information for notifying the user that the authentication function of the first authentication is set to OFF until a second period passes since the vehicle made transition from a started state to a stopped state.

8. A vehicle comprising the authentication device according to claim 1.

9. An authentication method to be executed by a computer of an authentication device to be mounted on a vehicle, the authentication method comprising:

executing first authentication based on biometric information acquired from a user and biometric information preregistered in the vehicle;
executing second authentication different from the first authentication; and
in response to the second authentication being successful, changing a setting of the first authentication to a state that allows the user to modify the setting of the first authentication.

10. The authentication method according to claim 9, wherein the state in which the user is able to change the setting is a state in which the user is able to set an authentication function of the first authentication from ON to OFF.

11. The authentication method according to claim 9, further comprising executing the second authentication when the first authentication is not successful.

12. The authentication method according to claim 9, further comprising executing the second authentication based on identification information acquired from a mobile device of the user and identification information preregistered in the vehicle.

13. The authentication method according to claim 10, further comprising, when the authentication function of the first authentication is set to OFF, notifying the user that the authentication function of the first authentication is set to OFF.

14. The authentication method according to claim 13, further comprising notifying the user that the authentication function of the first authentication is set to OFF before a first period passes since the authentication function of the first authentication was set to OFF.

15. The authentication method according to claim 13, further comprising causing a display device of the vehicle to display information for notifying the user that the authentication function of the first authentication is set to OFF until a second period passes since the vehicle made transition from a started state to a stopped state.

16. A non-transitory storage medium storing instructions that are executable by one or more computers of an authentication device and that cause the one or more computers to perform functions, the authentication device being mounted on a vehicle, the functions comprising:

executing first authentication based on biometric information acquired from a user and biometric information preregistered in the vehicle;

executing second authentication different from the first authentication; and in response to the second authentication being successful, changing a setting of the first authentication to a state that allows the user to modify the setting of the first authentication.

17. The non-transitory storage medium according to claim 16, wherein the state in which the user is able to change the setting is a state in which the user is able to set an authentication function of the first authentication from ON to OFF.

18. The non-transitory storage medium according to claim 16, the functions further comprising executing the second authentication when the first authentication is not successful.

19. The non-transitory storage medium according to claim 16, the functions further comprising executing the second authentication based on identification information acquired from a mobile device of the user and identification information preregistered in the vehicle.

20. The non-transitory storage medium according to claim 17, the functions further comprising, when the authentication function of the first authentication is set to OFF, notifying the user that the authentication function of the first authentication is set to OFF.

\* \* \* \* \*